US008666182B2

(12) United States Patent  (10) Patent No.: US 8,666,182 B2
Kim et al.  (45) Date of Patent: Mar. 4, 2014

(54) METHOD FOR GENERATING THUMBNAIL IMAGE IN IMAGE FRAME OF THE H.264 STANDARD (75) Inventors: Won Ha Kim, Seongnam-si (KR); Hyung Suk Oh, Seongnam-si (KR)

(73) Assignee: University-Industry Cooperation Group of Kyung-Hee University, Yongin-Si, Gyeonggi-Do (KR)

( * ) Notice: Subject to any disclaimer, the term of this patent is extended or adjusted under 35 U.S.C. 154(b) by 225 days.

(21) Appl. No.: 13/058,643
(22) PCT Filed: Aug. 13, 2009
(86) PCT No.: PCT/KR2009/004517
§ 371 (c)(1), (2), (4) Date: Feb. 11, 2011
(87) PCT Pub. No.: WO2010/019002
PCT Pub. Date: Feb. 18, 2010

(65) Prior Publication Data
US 2011/0142359 A1 Jun. 16, 2011

(30) Foreign Application Priority Data
Aug. 13, 2008 (KR) .......... 10-2008-0079242
Apr. 14, 2009 (KR) .......... 10-2009-0032275

(51) Int. Cl.
G06K 9/46 (2006.01)
(52) U.S. Cl.
USPC .......................... 382/235
(58) Field of Classification Search
None
See application file for complete search history.

(56) References Cited

U.S. PATENT DOCUMENTS

| 8,265,147 B2* | 9/2012 | Kim | 375/240.12 |
| 2006/0227871 A1* | 10/2006 | Budagavi | 375/240.12 |
| 2007/0147498 A1* | 6/2007 | Tanaka et al. | 375/240.03 |
| 2008/0159388 A1* | 7/2008 | Kim | 375/240.12 |
| 2008/0165846 A1* | 7/2008 | Kim | 375/240.12 |
| 2010/0166070 A1* | 7/2010 | Goel | 375/240.15 |

FOREIGN PATENT DOCUMENTS

KR  10-2006-0022894  3/2006

OTHER PUBLICATIONS

Sang-Jun Yu et al.; "An Efficient Thumbnail Extraction Method in H.264/AVC Bitstreams"; Feb. 13, 2008; pp. 222-235.

* cited by examiner

*Primary Examiner* — Sean Motsinger
(74) *Attorney, Agent, or Firm* — Lowe Hauptman & Ham, LLP (57) ABSTRACT

The present invention relates to a method for generating a thumbnail image for a video image, and more particularly, to a method for generating a thumbnail image for a video image that includes directly computing a DC coefficient of a prediction block for the video block constituting a video image from a prediction reference pixel of the video block of a spatial domain, and computing a DC coefficient of the video block from the computed DC coefficient of the prediction block and from a DC coefficient of an residual block for the video block. The method for generating a thumbnail image according to the present invention directly computes a DC coefficient of the video block from the DC coefficient of the residual block for the video block and the DC coefficient of the prediction block for the video block, thus generating a thumbnail image for a video image of the H.264 standard without transforming the video block between the spatial domain and a transform domain constituting a video image, and quickly searching a specific video image through the thumbnail image in a multimedia terminal where a plurality of video images are stored.

7 Claims, 8 Drawing Sheets

|  | Number of add operation | Number of shifts | Number of memory accesses |
|---|---|---|---|
| Fast IDCT | 96 | 48 | 192 |
| Direct IDCT | 240 | 112 | 64 |
| Present invention | 59 | 26 | 8 |

FIG 11

|   | $A_1$ $B_1$ $C_1$ $D_1$ | $A_2$ $B_2$ $C_2$ $D_2$ | $A_3$ $B_3$ $C_3$ $D_3$ | $A_4$ $B_4$ $C_4$ $D_4$ |
|---|---|---|---|---|
| $I_1$ $J_1$ $K_1$ $L_1$ | First 4X4 block | Second 4X4 block | Third 4X4 block | Fourth 4X4 block |
| $I_2$ $J_2$ $K_2$ $L_2$ | Fifth 4X4 block | Sixth 4X4 block | Seventh 4X4 block | Eighth 4X4 block |
| $I_3$ $J_3$ $K_3$ $L_3$ | Ninth 4X4 block | tenth 4X4 block | Eleventh 4X4 block | Thwelfth 4X4 block |
| $I_4$ $J_4$ $K_4$ $L_4$ | Thirteenth 4X4 block | Fourteenth 4X4 block | Fifteenth 4X4 block | Sixteenth 4X4 block |

(M appears at top-left of the grid)

FIG 12

METHOD FOR GENERATING THUMBNAIL IMAGE IN IMAGE FRAME OF THE H.264 STANDARD

CROSS REFERENCE TO RELATED APPLICATION

This application claims the priority of Korean Patent Application No. 10-2008-0079242 and 10-2009-0032275, respectively filed on Aug. 13, 2008 and April 14, 2009, in the KIPO (Korean Intellectual Property Office), the disclosure of which are incorporated herein in their entirety by reference. Further, this application is the National Phase application of International Application No. PCT/KR2009/004517, filed Aug. 13, 2009, which designates the United States and was published in Korean. Each of these applications is hereby incorporated by reference in their entirety into the present application.

TECHNICAL FIELD

The present invention relate to a method for generating a thumbnail image for a video image, and more particularly, to a method for generating a thumbnail image for a video image, which includes the steps of directly computing a DC coefficient of a prediction block for a video block constituting the video image from prediction reference pixels of the video block of a spatial domain, and computing a DC coefficient of the video block based on the computed DC coefficient of the prediction block and a DC coefficient of an residual block for the video block.

BACKGROUND ART

Video compression is adopted in a variety of fields, such as a digital TV, an Internet streaming video, and a DVD-video, and emerged as a core element of broadcasting and entertainment media. Success of the digital TV and the DVD video is based on MPEG-2 standards announced 15 years ago. Although usefulness of the technique is sufficiently proved, it is an outdated technique now. It is apparent that now is the time to replace further effective and efficient techniques for the MPEG-2 taking advantage of advanced processing capability. Although it is still in controversy over the techniques that can replace the MPEG-2, H.264/AVC (Advanced Video Coding) is one of the most likely techniques considered in the argument.

H.264/AVC is a standard for expressing encoded visual information developed by the Video Coding Experts Group (VCEG), which is a study group of International Telecommunication Union (ITU-T).

H.264/AVC does not separately define a codec (encoder/decoder) and defines only syntaxes for encoded video bitstreams and methods for decoding the bitstreams. An encoded picture is divided into a plurality of macroblocks, and each of the macroblocks has a 16×16 luminance sample and a color difference sample related to the luminance sample. The macroblocks in each picture are arranged in a slice, and the macroblocks are sequentially arranged in the slice in order of scan. The macro blocks are included in an I slice, a P slice or a B slice. The I slice includes only intra macroblocks, and the P slice includes inter macroblocks and intra macroblocks. The B slice includes inter macroblocks and intra macroblocks. The intra macroblock is predicted from reference samples decoded and reconstructed in the current slice using intra prediction.

Figure 1:
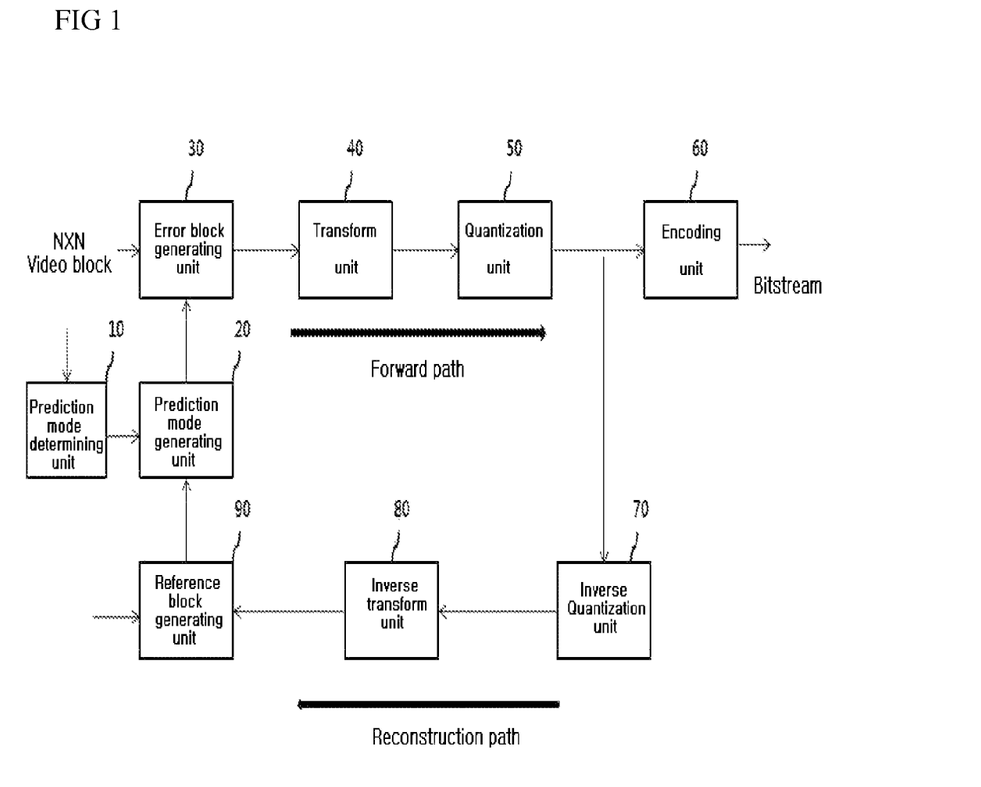
FIG. 1 is a functional block diagram showing an intra prediction performed by a conventional H.264/AVC encoder.

FIG. 1 is a functional block diagram showing an intra prediction performed by a conventional H.264/AVC encoder.

The H.264/AVC encoder includes two data flow paths of a "forward" path (from left to right) and a "reconstruction" path (from right to left). In the "forward" path, a prediction block is generated from a reconstructed reference block, and an residual pixel block is generated by substracting a video block to be encoded currently from the generated prediction block. In the "reconstruction" path, a reference pixel block of a video block to be encoded next is generated by adding the generated residual pixel block and the prediction block.

The "forward" and "reconstruction" paths will be described in further detail with reference to FIG. 1. First, in case of the "forward" path, a prediction mode determining unit 10 determines an intra prediction mode for an inputted N×N video block of the spatial domain. A prediction block generating unit 20 generates a prediction block for the inputted N×N video block of the spatial domain using a stored reference block, based on the determined intra prediction mode.

An residual block generating unit 30 generates an N×N residual block by substracting the inputted N×N video block of the spatial domain and the generated prediction block from each other. A transform unit 40 transforms the N×N residual block into an N×N residual coefficient block of the transform domain in a block-based transform method. Preferably, a discrete cosine transform (DCT) or an integer DCT method is used among block-based transform methods.

A quantization unit 50 quantizes the N×N residual coefficient block of the transform domain, and an encoding unit 60 generates a bitstream by encoding the quantized N×N residual coefficient block in any one of a prediction encoding method, a variable length encoding method, and an arithmatic coding method.

Meanwhile, in case of the "reconstruction" path, an inverse quantization unit 70 inverse-quantizes the quantized N×N residual coefficient block outputted from the quantization unit 50, and an inverse transform unit 80 generates an N×N residual block of the spatial domain by inverse-transforming the inverse-quantized N×N residual coefficient block. A reference block generating unit 90 reconstructs a reference block used for regenerating a prediction block by adding the N×N residual block and the prediction block.

As described above, the H.264/AVC encoder is specified to compress a video image using an N×N residual coefficient block, and a prediction block used for generating the N×N residual coefficient block is determined through an intra prediction mode of an N×N video block to be encoded. For the H.264/AVC encoder, nine intra prediction modes are defined for a luminance 4×4 video block, and four intra prediction modes are defined for a luminance 16×16 video block. For a color difference video, four intra prediction modes are defined for an 8×8 video block.

Figure 2:
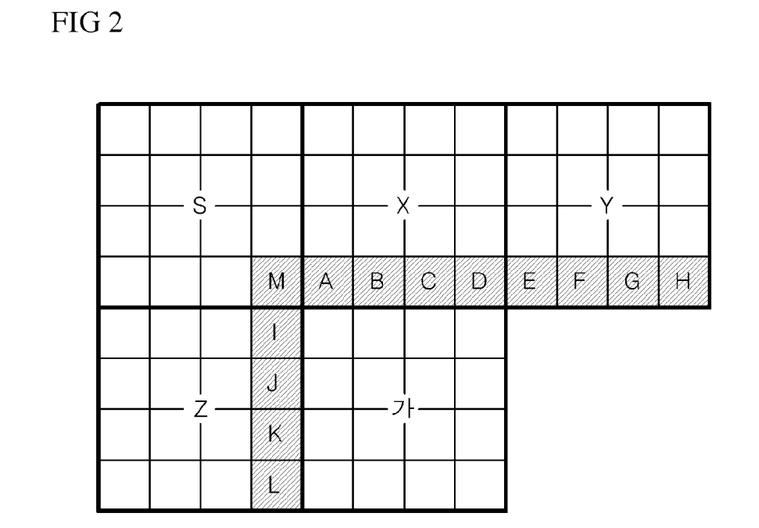
FIG. 2 is a view for describing nine intra prediction modes used in a 4×4 video block.

The nine intra prediction modes used for the 4×4 video block will be described in further detail with reference to FIG. 2.

1) Prediction Mode 0 (Vertical)

The vertical mode is a prediction mode using four pixels of video block(X) placed above block (가) to be encoded currently.

Pixel A is filled in four pixels of the first column of the block, and pixel B is filled in four pixels of the second column of the block. Pixels C and D are respectively filled in four pixels of a corresponding column of the block.

2) Prediction Mode 1 (Horizontal)

The horizontal mode is a prediction mode using four pixels of video block(Z) placed at the left of block (가) to be encoded currently.

Pixel I is filled in four pixels of the first row of the block, and pixel J is filled in four pixels of the second row of the block. Pixels K and L are respectively filled in four pixels of a corresponding row of the block.

3) Prediction Mode 2 (DC)

The DC mode is a prediction mode using an average of four pixels I, J, K and L of video block(Z) placed at the left of block (가) and four pixels A, B, C and D of video block X placed above block (가) to be encoded currently.

4) Prediction Mode 3 (Diagonal Down-Left)

The diagonal down-left mode is a prediction mode using four pixels of video block (X) placed above block (가) and four pixels of video block (Y) placed at the up-right of block (가) to be encoded currently.

Pixels are filled at an angle of 45 degrees between the down-left and the up-right of the block to be encoded.

5) Prediction Mode 4 (Diagonal Down-Right)

The diagonal down-right mode is a prediction mode using four pixels of video block (X) placed above block (가), one pixel Q of video block (S) placed at the up-left of block (가), and four pixels of video block (Z) placed at the left of block (가) to be encoded currently.

Pixels are filled in the direction of 45 degrees toward the down-right of the block to be encoded.

6) Prediction Mode 5 (Vertical-Right)

The vertical-right mode is a prediction mode using four pixels of video block (X) placed above block (가), one pixel Q of video block (S) placed at the up-left of block (가), and four pixels of video block (Z) placed at the left of block (가) to be encoded currently.

Pixels are filled in the direction of 26.6 degrees toward the vertical right of the block to be encoded.

(width/height−1/2)

Prediction Mode 6 (Horizontal-Down Mode)

The horizontal-down mode is a prediction mode using four pixels of video block (X) placed above block (가), one pixel Q of video block (S) placed at the up-left of block (가), and four pixels of video block (Z) placed at the left of block (가) to be encoded currently.

Pixels are filled in the direction of 26.6 degrees toward the horizontal down of the block to be encoded.

8) Prediction Mode 7 (Vertical-Left)

The vertical-left mode is a prediction mode using four pixels of video block (X) placed above block (가) and one pixel E of video block (Y) placed at the up-right of block (가) to be encoded currently.

Pixels are filled in the direction of 26.6 degrees toward the vertical left of the block to be encoded.

9) Prediction Mode 8 (Horizontal-Up)

The horizontal-up mode is a prediction mode using four pixels of video block (Z) placed at the left of block (가) to be encoded currently.

Pixels are interpolated in the direction of 26.6 degrees toward the horizontal up of the block, to be encoded.

In the meantime, a multimedia terminal, such as a cellular phone, a digital TV or the like, searches for video data stored in the multimedia terminal using a small size image (hereinafter, referred to as a 'thumbnail image') in order to preview the stored image.

Figure 3:
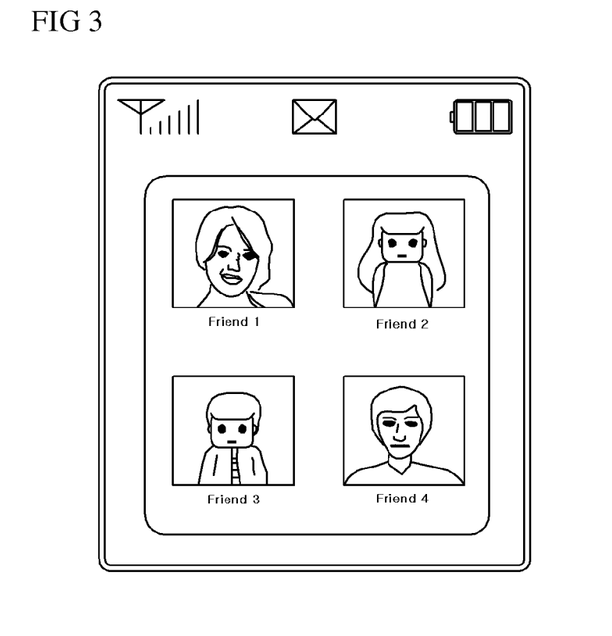
FIG. 3 is a view showing an example of a thumbnail image used in a cellular phone.

FIG. 3 is a view showing an example of a thumbnail image used in a cellular phone. Describing the thumbnail image shown in FIG. 3, a large number of images or moving images stored in the cellular phone are previously displayed on a display unit in the form of a thumbnail image. If a user searches for an image or a moving image desired to play back through the displayed thumbnail images and selects a certain image from the searched images or moving images, the selected image is played back in the original size of the image.

Conventional methods for generating a thumbnail image from an original video image can be largely divided into two types. The first method generates a thumbnail image for a video image by down-sampling the video image of the spatial domain. The second method generates a thumbnail image of an original video image by extracting only a DC coefficient from each video coefficient block of the transform domain constituting the video image. The DC coefficient existing at the up-left of each video coefficient block of the transform domain is an average value for each video pixel block of the spatial domain, and the video image generated by extracting only the DC coefficient is the same as the image generated by down-sampling the original video image by 1/N.

DISCLOSURE OF INVENTION

Technical Problem

In order to generate a thumbnail image for a video image of standard H.264 in the first method described above, a residual video block of the transform domain is inverse transformed into the spatial domain, and a reconstruction block of the spatial domain is generated by adding the inverse transformed residual video block of the spatial domain and a prediction block of the spatial domain, and then, a thumbnail image of the video image is generated by down-sampling the reconstruction block once more. Therefore, the first method has a problem in that a video image is transformed repeatedly between the transform domain and the spatial domain in order to generate a thumbnail image for a video image of standard H.264.

In the meantime, in order to generate a thumbnail image for a video image of standard H.264 in the second method described above, an residual coefficient block of the transform domain is inverse transformed into the spatial domain, and a reference pixel block of the spatial domain is reconstructed by adding the inverse transformed residual pixel block of the spatial domain and a prediction block of the spatial domain, and then, a DC coefficient is extracted by retransforming the reference pixel block of the spatial domain into the transform domain. Therefore, there is a problem in that an extended period of processing time and a complex data processing procedure are needed.

Furthermore, only a part of the reconstructed reference pixel block use the reference pixels used by the H.264/AVC encoder to generate a prediction block based on an intra prediction mode. However, the conventional H.264/AVC encoder reconstructs the entire reference pixel block. Accordingly, since a large amount of computation is performed in order to reconstruct the entire reference pixel block, the hardware is heavily loaded. Furthermore, the conventional H.264/AVC encoder requires a large storage space in order to store unused reference pixels of the reference pixel block, and the number of accesses to the storage space is increased. Therefore, there is caused a problem in that an extended period of time is required to generate a prediction block.

The present invention has been made to solve the above-mentioned problems associated with the conventional thumbnail image generating method, and it is an object of the present invention is to provide a method for generating a thumbnail image, in which only a DC coefficient of a video block needed for generating the thumbnail image is computed with a small\ amount of computation, and the thumbnail image is generated from the computed DC coefficient of the video block.

Another object of the present invention is to provide a method for generating a thumbnail image, in which the thumbnail image can be generated with a small process by generating only the reference pixels used for generating a prediction block in an intra prediction, and a small storage space is required by storing only the reference pixels used for generating the prediction block.

Technical Solution

To achieve the above objects, the present invention provides a method for generating a thumbnail image from H.264-based N×N video blocks constituting a video frame, the method including the steps of: extracting prediction reference pixels for the N×N video blocks; computing a DC coefficient of a prediction block for each unit video block constituting the N×N video block using the extracted prediction reference pixels of the N×N video block, based on an intra prediction mode of the N×N video block; and computing a DC coefficient of the N×N video block by adding the computed DC coefficient of the prediction block for the each unit video block and a DC coefficient of an residual block for the each unit video block.

Here, the DC coefficient of the prediction block for the each unit video block is computed by a combination of the prediction reference pixels for the N×N video block.

Here, the prediction reference pixels are reference pixels in a neighborhood of the N×N video block used for intra prediction of the N×N video block.

Preferably, the method according to the present invention further includes the steps of (a1) computing prediction pixels from the previously stored prediction reference pixels of the unit video block, based on the intra prediction mode of the unit video block; (a2) computing residual pixels of the unit video block; (a3) generating prediction reference pixels for a unit video block inputted next to the unit video block by adding the computed prediction pixels and the residual pixels; and (a4) storing the generated prediction reference pixels of the unit video block, whereby the prediction reference pixels are generated on the basis of unit video block constituting the N×N video block.

Here, the residual pixels of the unit video block are residual pixels of pixels placed on a border of the unit video block, and preferably, the residual pixels of the unit video block are residual pixels of pixels placed on right and bottom borders of the unit video block.

Preferably, if a size of the N×N video block is a 4×4 video block, the prediction reference pixels of the N×N video block are 13 reference pixels in a neighborhood of the N×N video block used for intra prediction of the N×N video block.

Advantageous Effects

In accordance with the present invention, the method for generating a thumbnail has the following diverse effects described below as compared to the conventional methods for generating a thumbnail.

First, since the method for generating a thumbnail image according to the invention computes a DC coefficient of a video block directly from a DC coefficient of an residual coefficient block for the video block and a DC coefficient of a prediction block for the video block, the thumbnail image for a video image of standard H.264 can be generated without transforming the video block between the spatial domain and the transform domain.

Second, since the method for generating a thumbnail image according to the invention computes a DC coefficient of a video block directly from a DC coefficient of an residual coefficient block for the video block and a DC coefficient of a prediction block for the video block, a specific video image can be rapidly searched through the thumbnail image in a multimedia terminal storing a large number of video images.

Third, since the method for generating a thumbnail image according to the invention computes only the reference pixels used for computing a DC coefficient of a prediction block, i.e., prediction reference pixels, instead of computing all reference pixels of a reference pixel block, the amount of computation and the number of memory accesses needed for computing prediction reference pixels are reduced, and thus thumbnail images can be rapidly generated.

BEST MODE FOR CARRYING OUT THE INVENTION

A method for generating thumbnail image according to the present invention will be described below in more detail with reference to the accompanying drawings.

Figure 4:
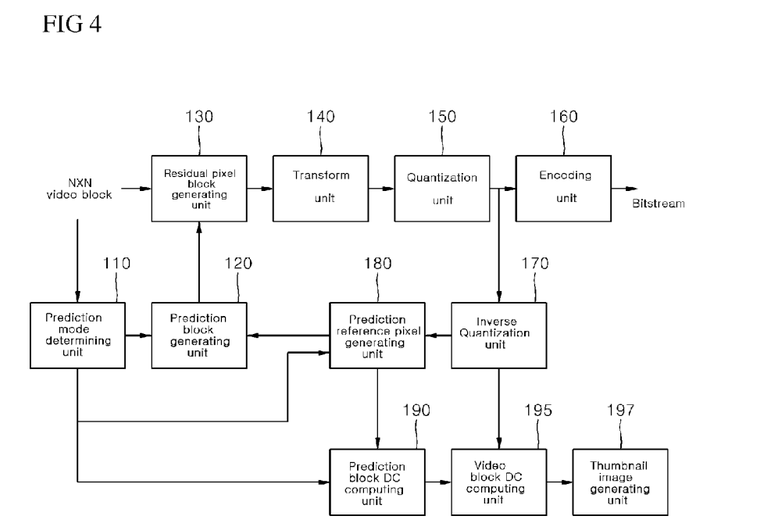
FIG. 4 is a functional block diagram showing an apparatus for generating a thumbnail image from an inputted or stored video frame in an image encoding apparatus of standard H.264 according to an embodiment of the invention.

FIG. 4 is a functional block diagram showing an apparatus for generating a thumbnail image from an inputted or stored video frame in an image encoding apparatus of standard H.264 according to an embodiment of the invention.

First, the "forward" path will be described below with reference to FIG. 4. If an N×N video block of the spatial domain is inputted, a prediction mode determining unit 110 determines an intra prediction mode for the inputted N×N video block. A prediction block generating unit 120 generates a prediction block of the spatial domain for the inputted N×N video block from previously reconstructed and stored reference pixels, based on the determined intra prediction mode of the N×N video block. An residual pixel block generating unit 130 generates an N×N residual pixel block of the spatial domain by substracting the inputted N×N video block and the generated prediction block from each other. A transform unit 140 generates a first N×N residual coefficient block of the transform domain by transforming the generated N×N residual pixel block of the spatial domain in a block-based transform method. Preferably, a DCT or an integer DCT method is used among block-based transform methods.

A quantization unit 150 quantizes the first N×N residual efficient block, and an encoding unit 160 generates a bitstream by encoding the quantized first N×N residual coefficient block in any one of a prediction encoding method, a variable length encoding method, and an arithmatic coding method.

Meanwhile, the "reconstruction" path will be described below with reference to FIG. 4. An inverse quantization unit 170 inverse-quantizes the N×N residual coefficient block outputted from the quantization unit 150 in order to generate a prediction block for a second N×N video block inputted next to a first N×N video block. The first N×N residual coefficient block outputted from the quantization unit 150 is inverse-quantized by the inverse quantization unit 170.

Figure 7:
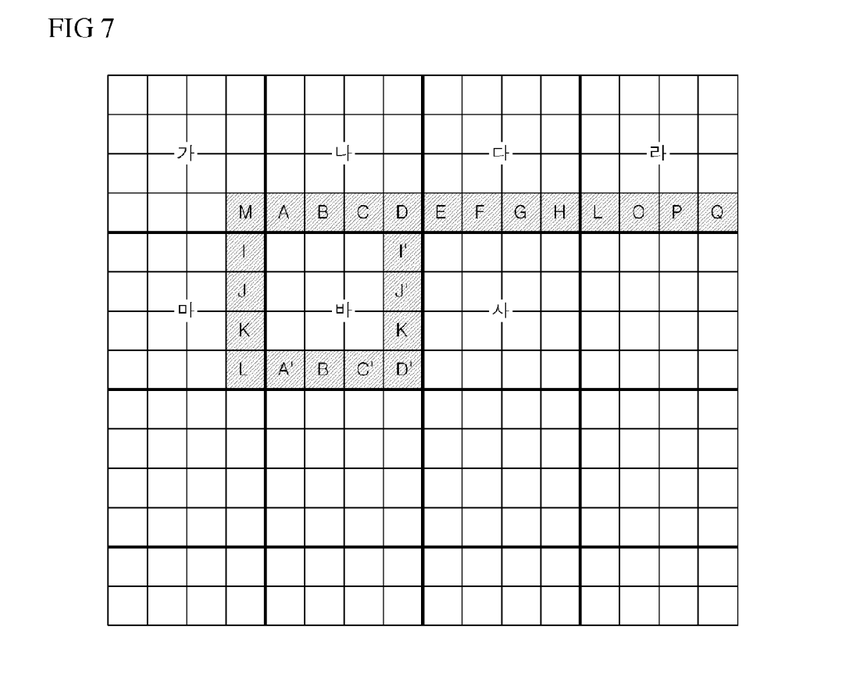
FIG. 7 is a view showing a prediction reference pixel of a 4×4 video block computed based on an intra prediction mode of the 4×4 video block.

A prediction reference pixel generating unit 180 generates prediction reference pixels of a video block. Here, the prediction reference pixels are reference pixels in the neighborhood of the video block, used for computing prediction pixels of the video block based on the intra prediction mode of the video block. For example, as shown in FIG. 7, prediction reference pixels for the 4×4 video block ("바"), are thirteen reference pixels A, B, C, D, E, F, G, H, I, J, K, L and M directly used for computing the prediction pixels based on the intra prediction mode of the 4×4 video block ("바"), , among the reference pixels in the neighborhood of the 4×4 video block ("바"), .

The prediction reference pixel generating unit 180 does not generate all reference pixels of the video block in order to generate prediction reference pixels of the video block, but generates only reference pixels used as the prediction reference pixels. That is, the prediction reference pixel generating unit 180 generates only the reference pixels placed on the border of the video block or the reference pixels placed on the right and bottom borders of the video block as prediction reference pixels.

For example, the prediction reference pixel generating unit 180 does not generate all reference pixels of the 4×4 video block ("바"), by reconstructing the entire 4×4 video block ("바"), from the 4×4 video block ("바"), , but generates only seven reference pixels A', B', C', D', I', J' and K' used as prediction reference pixels. The generated seven reference pixels A', B', C', D', I', J' and K' are used as some of thirteen prediction reference pixels of the next video block ("사"), . That is, reference pixels I', J', K' and D' among the generated seven reference pixels A', B', C', D', I', J' and K' are used as prediction reference pixels of the video block ("사"), , together with previously stored other reference pixels D, E, F, G, H, L, O, P and Q of the next video block ("사"), .

The prediction reference pixel generating unit 180 computes prediction reference pixels A', B', C', D', I', J' and K' for the video block ("사"), inputted next to the 4×4 video block ("바"), by adding the prediction pixels of the 4×4 video block ("바"), and residual pixels computed from an residual block. The prediction pixels of the 4×4 video block ("바"), are computed using the prediction reference pixels A, B, C, D, E, F, G, H, I, J, K, L and M of the 4×4 video block ("바"), based on the intra prediction mode of the 4×4 video block ("바"), .

The residual pixels for each unit video block constituting an N×N video block used for generating prediction reference pixels of the N×N video block are computed by inverse-transforming an residual coefficient block for each unit video block into the spatial domain. In the present invention, only the residual pixels needed for generating prediction reference pixels of the N×N video block are computed. Preferably, in order to reduce the amount of computation in the present invention, only the residual pixels needed for generating the prediction reference pixels of the N×N video block are computed using transform element values computed by combining residual coefficients of the residual coefficient for each unit video block constituting the N×N video block.

In the same manner, prediction reference pixels of all N×N video blocks constituting a video frame are computed in order and stored in the prediction reference pixel generating unit 180. The prediction reference pixel generating unit 180 described above generates the prediction reference pixels by the unit of 4×4 video block, i.e., on the basis of a unit video block:

A prediction block DC computing unit 190 computes a DC coefficient of a prediction block for a unit video block constituting the N×N video block, based on the intra prediction mode of the N×N video block determined by the prediction mode determining unit 110 and the prediction reference pixels of the N×N video block. The DC coefficient of the prediction block is a DC coefficient of a prediction block for each unit video block generated by transforming the prediction block for each unit video block constituting the N×N video block on the basis of block. In the present invention, the DC coefficient of the prediction block is computed from the prediction reference pixels of the N×N video block. A video block DC computing unit 195 computes a DC coefficient of the N×N video block by adding the computed DC coefficient of the prediction block for each unit video block and the DC coefficient of the residual coefficient block for each unit video block. A thumbnail image generating unit 197 generates a thumbnail image for a video frame by combining DC coefficients of all N×N video blocks constituting the video frame. The unit video block constituting the N×N video block described above is a unit size of a video block used for generating prediction reference pixels and computing a DC coefficient of the N×N video block, which is a 4×4 video block. Accordingly, in the case of an 8×8 video block, prediction reference pixels are generated, or a DC coefficient is computed for each of four 4×4 unit video blocks constituting the 8×8 video block. In the case of a 16×16 video block, prediction reference pixels are generated, or a DC coefficient is computed for each of sixteen 4×4 unit video blocks.

Figure 5:
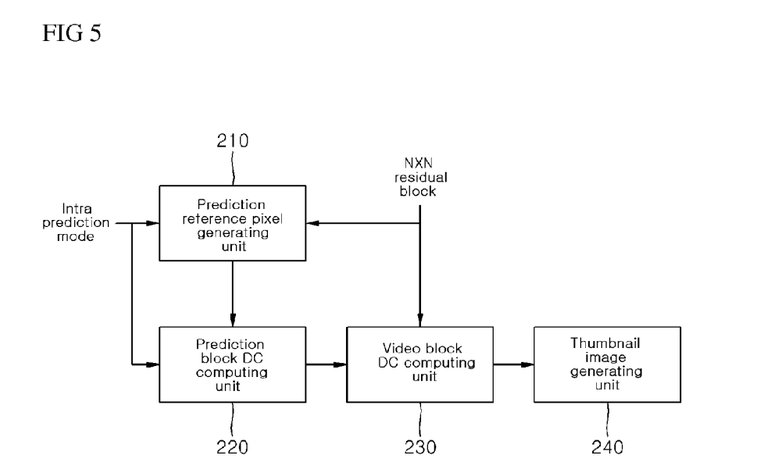
FIG. 5 is a functional block diagram showing an apparatus for generating a thumbnail image from a received or stored video frame in an image decoding apparatus of standard H.264 according to an embodiment of the invention.

FIG. 5 is a functional block diagram showing an apparatus for generating a thumbnail image from a received or stored video frame in an image decoding apparatus of standard H.264 according to an embodiment of the invention. Describing in further detail with reference to FIG. 5, a prediction reference pixel generating unit 210 computes prediction pixels of each unit video block constituting an N×N video block from prediction reference pixels of the N×N video block, based on the intra prediction mode of the N×N video block, and computes residual pixels of an residual coefficient block for each unit video block. The prediction reference pixel generating unit 210 generates the prediction reference pixels for each unit video block by adding the computed prediction pixels and the residual pixels of each unit video block constituting the N×N video block.

A prediction block DC computing unit 220 computes a DC coefficient of a prediction block for each unit video block constituting the N×N video block, based on the intra prediction mode of the N×N video block and previously stored prediction reference pixels of the N×N video block. The DC coefficient of a prediction block is a DC coefficient of a prediction coefficient block generated by transforming the prediction block for each unit video block constituting the N×N video block on the basis of block transform. In the present invention, the DC coefficient of the prediction block is computed from the prediction reference pixels of the N×N video block. A video block DC computing unit 230 computes a DC coefficient of each unit video block constituting the inputted N×N video block by adding the computed DC coefficient of the prediction block for each unit video block and the DC coefficient of the residual coefficient block. That is, the video block DC computing unit 230 computes a DC coefficient of each unit video block constituting the N×N video block by the unit of N×N video block. A thumbnail image generating unit 295 generates a thumbnail image of a video frame by combining DC coefficients of all video blocks.

Figure 6:
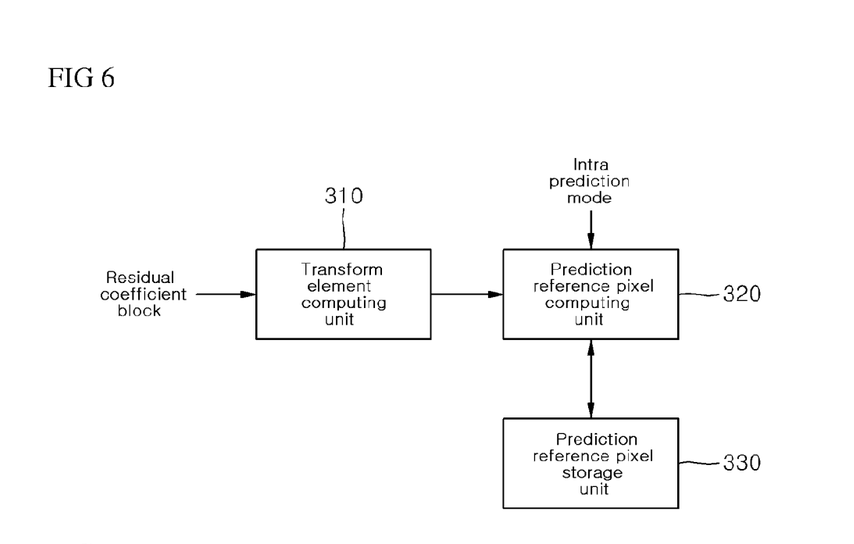
FIG. 6 is a functional block diagram showing a prediction reference pixel generating unit according to the invention in further detail.

FIG. 6 is a functional block diagram showing a prediction reference pixel generating unit according to the invention in further detail.

Describing with reference to FIG. 6, the prediction reference pixel generating unit includes a transform element computing unit 310, a prediction reference pixel computing unit 320, and a prediction reference pixel storage unit 330. The prediction reference pixel generating unit generates prediction reference pixels by adding prediction pixels generated based on the intra prediction mode of each unit video block and residual pixels of each unit video block. The prediction reference pixel generating unit uses transform element values in order to reduce the amount of computation needed for computing residual pixels of each unit video block from the residual coefficient block of each unit video block. The transform element computing unit 310 computes the transform element values $H_0$, $H_1$, $H_2$, $H_3$, $V_0$, $V_1$, $V_2$ and $V_3$ used for computing each residual pixel of the unit video block from each residual coefficient block of the unit video block as shown in Equations 1 to 8.

$$H_0 = W_{00} - W_{01} + W_{02} - \frac{1}{2}W_{03} \quad \text{[Equation 1]}$$

$$H_1 = W_{10} - W_{11} + W_{12} - \frac{1}{2}W_{13} \quad \text{[Equation 2]}$$

$$H_2 = W_{20} - W_{21} + W_{22} - \frac{1}{2}W_{23} \quad \text{[Equation 3]}$$

$$H_3 = W_{30} - W_{31} + W_{32} - \frac{1}{2}W_{33} \quad \text{[Equation 4]}$$

$$V_0 = W_{00} - W_{10} + W_{20} - \frac{1}{2}W_{30} \quad \text{[Equation 5]}$$

$$V_1 = W_{01} - W_{11} + W_{21} - \frac{1}{2}W_{13} \quad \text{[Equation 6]}$$

$$V_2 = W_{02} - W_{12} + W_{22} - \frac{1}{2}W_{32} \quad \text{[Equation 7]}$$

$$V_3 = W_{03} - W_{13} + W_{23} - \frac{1}{2}W_{33} \quad \text{[Equation 8]}$$

Here, the residual block W of the transform domain for a unit video block is as shown in Equation 9.

$$W = \begin{bmatrix} W_{00} & W_{01} & W_{02} & W_{03} \\ W_{10} & W_{11} & W_{12} & W_{13} \\ W_{20} & W_{21} & W_{22} & W_{23} \\ W_{30} & W_{31} & W_{32} & W_{33} \end{bmatrix} \quad \text{[Equation 9]}$$

The prediction reference pixel computing unit 320 computes prediction reference pixels for a unit video block inputted next to the current unit video block by adding the prediction pixels and the residual pixels of the unit video block. The prediction pixels are generated from the prediction reference pixels of the unit video block previously stored in the prediction reference pixel storage unit 330, based on the intra prediction mode of the unit video block. That is, the prediction reference pixel computing unit 320 computes the prediction reference pixel by adding the prediction reference pixel and the residual pixel at the position of the prediction pixel.

The prediction reference pixels of a 4×4 video block computed based on the intra prediction mode of the 4×4 video block will be described in detail with reference to FIG. 7. Equation 10 shown below is an equation for generating prediction reference pixels for the 4×4 video block based on the vertical mode, i.e., prediction mode 0, in the 4×4 luminance mode.

$A'=((A)*a+V0+V1+V2+1/2*V3+a/2)/a$ $B'=((B)*a+V0+1/2*V1-V2-V3+a/2)/a$ $C'=((C)*a+V0-1/2*V1-V2+V3+a/2)/a$ $D'=((D)*a+H0-H1+H2-1/2*H3+a/2)/a$ $I'=((D)*a+H0+H1+H2+1/2*H3+a/2)/a$ $J'=((D)*a+H0+1/2*H1-H2-H3+a/2)/a$ $K'=((D)*a+H0-1/2*H1+H2+H3+a/2)/a$ $L'=D'$ [Equation 10]

In the meantime, Equation 11 is an equation for generating prediction reference pixels for a 4×4 video block based on the horizontal mode, i.e., prediction mode 1, in the 4×4 luminance mode.

$A'=((L)*a+V0+V1+V2+1/2*V3+a/2)/a$ $B'=((L)*a+V0+1/2*V1-V2-V3+a/2)/a$ $C'=((L)*a+V0-1/2*V1-V2+V3+a/2)/a$ $D'=((L)*a+H0-H1+H2-1/2*H3+a/2)/a$ $I'=((I)*a+H0+H1+H2+1/2*H3+a/2)/a$ $J'=((J)*a+H0+1/2*H1-H2-H3+a/2)/a$ $K'=((K)*a+H0-1/2*H1+H2+H3+a/2)/a$ $L'=D'$ [Equation 11]

In the meantime, Equation 12 is an equation for generating prediction reference pixels for a 4×4 video block based on the DC mode, i.e., prediction mode 2, in the 4×4 luminance mode.

$Avg=(A+B+C+D+I+J+K+L)/8$ $A'=((Avg)*a+V0+V1+V2+1/2*V3+a/2)/a$ $B'=((Avg)*a+V0+1/2*V1-V2-V3+a/2)/a$ $C'=((Avg)*a+V0-1/2*V1-V2+V3+a/2)/a$ $D'=((Avg)*a+H0-H1+H2-1/2*H3+a/2)/a$ $I'=((Avg)*a+H0+H1+H2+1/2*H3+a/2)/a$ $J'=((Avg)*a+H0+1/2*H1-H2-H3+a/2)/a$ $K'=((Avg)*a+H0-1/2*H1+H2+H3+a/2)/a$ $L'=D'$ [Equation 12]

In the meantime, Equation 13 is an equation for generating prediction reference pixels for a 4×4 video block based on the diagonal down-left mode, i.e., prediction mode 3, in the 4×4 luminance mode.

$temp1=(D+F+2*E+2)/4$ $A'=((temp1)*a+V0+V1+V2+1/2*V3+a/2)/a$ $temp2=(E+G+2*F+2)/4$ $B'=((temp3)*a+V0+1/2*V1-V2-V3+a/2)/a$ $temp3=(F+H+2*G+2)/4$ $C'=((temp3)*a+V0-1/2*V1-V2+V3+a/2)/a$ $temp4=(G+3*H+2)/4$ $D'=((temp4)*a+H0-H1+H2-1/2*H3+a/2)/a$ $I'=A'$ $J'=B'$ $K'=C'$ $L'=D'$ [Equation 13]

In the meantime, Equation 14 is an equation for generating prediction reference pixels for a 4×4 video block based on the diagonal down-right mode, i.e., prediction mode 4, in the 4×4 luminance mode.

$temp1=(L+2*K+J+2)/4$ $A'=((temp1)*a+V0+V1+V2+1/2*V3+a/2)/a$ $temp2=(K+2*J+O+2)/4$ $B'=((temp2)*a+V0+1/2*V1-V2-V3+a/2)/a$ $temp3=(J+2*I+OM+2)/4$ $C'=((temp3)*a+V0-1/2*V1-V2+V3+a/2)/a$ $temp4=(I+2*OM+A+2)/4$ $D'=((temp4)*a+H0-H1+H2-1/2*H3+a/2)/a$ $temp5=(B+2*C+D+2)/4$ $I'=((temp5)*a+H0+H1+H2+1/2*H3+a/2)/a$ $temp6=(A+2*B+C+2)/4$ $J'=((temp6)*a+H0+1/2*H1-H2-H3+a/2)/a$ $temp7=(OM+2*A+B+2)/4$ $K'=((temp7)*a+H0-1/2*H1+H2+H3+a/2)/a$ $L'=D'$ [Equation 14]

In the meantime, Equation 15 is an equation for generating prediction reference pixels for a 4×4 video block based on the vertical right mode, i.e., prediction mode 5, in the 4×4 luminance mode.

$temp1=(I+2*J+K+2)/4$ $A'=((temp1)*a+V0+V1+V2+1/2*V3+a/2)/a$ $temp2=(I+2*OM+A+2)/4$ $B'=((temp2)*a+V0+1/2*V1-V2-V3+a/2)/a$ $temp3=(OM+2*A+B+2)/4$ $C'=((temp3)*a+V0-1/2*V1-V2+V3+a/2)/a$ $temp4=(A+2*B+C+2)/4$ $D'=((temp4)*a+H0-H1+H2-1/2*H3+a/2)/a$ $temp5=(C+D+1)/2$ $I'=((temp5)*a+H0+H1+H2+1/2*H3+a/2)/a$ $temp6=(B+2*C+D+2)/4$ $J'=((temp6)*a+H0+1/2*H1-H2-H3+a/2)/a$ $temp7=(B+C+1)/2$ $K'=((temp7)*a+H0-1/2*H1+H2+H3+a/2)/a$ $L'=D'$ [Equation 15]

In the meantime, Equation 16 is an equation for generating prediction reference pixels for a 4×4 video block based on the horizontal down mode, i.e., prediction mode 6, in the 4×4 luminance mode.

$temp1=(K+L+1)/2$ $A'=((temp1)*a+V0+V1+V2+1/2*V3+a/2)/a$ $temp2=(J+2*K+L+2)/4$ $B'=((temp2)*a+V0+1/2*V1-V2-V3+a/2)/a$ $temp3=(J+K+1)/2$ $C'=((temp3)*a+V0-1/2*V1-V2+V3+a/2)/a$ $temp4=(I+2*J+K+2)/4$ $D'=((temp4)*a+H0-H1+H2-1/2*H3+a/2)/a$ $temp5=(A+2*B+C+2)/4$ $I'=((temp5)*a+H0+H1+H2+1/2*H3+a/2)/a$ $temp6=(I+2*OM+A+2)/4$ $$J'=((temp6)*a+H0+1/2*H1-H2-H3+a/2)/a$$

$$temp7=(OM+2*I+J+2)/4$$

$$K'=((temp7)*a+H0-1/2*H1+H2+H3+a/2)/a$$

$$L'=D' \quad \text{[Equation 16]}$$

In the meantime, Equation 17 is an equation for generating prediction reference pixels for a 4×4 video block based on the vertical down mode, i.e., prediction mode 7, in the 4×4 luminance mode.

$$temp1=(B+2*C+D+2)/4$$

$$A'=((temp1)*a+V0+V1+V2+1/2*V3+a/2)/a$$

$$temp2=(C+2*D+E+2)/4$$

$$B'=((temp2)*a+V0+1/2*V1-V2-V3+a/2)/a$$

$$temp3=(D+2*E+F+2)/4$$

$$C'=((temp3)*a+V0-1/2*V1-V2+V3+a/2)/a$$

$$temp4=(E+2*F+G+2)/4$$

$$D'=((temp4)*a+H0-H1+H2-1/2*H3+a/2)/a$$

$$temp5=(D+E+1)/2$$

$$I'=((temp5)*a+H0+H1+H2+1/2*H3+a/2)/a$$

a $$temp6=(D+2*E+F+2)/4$$

$$J'=((temp6)*a+H0+1/2*H1-H2-H3+a/2)/a$$

$$temp7=(E+F+1)/2$$

$$K'=((temp7)*a+H0-1/2*H1+H2+H3+a/2)/a$$

$$L'=D' \quad \text{[Equation 17]}$$

In the meantime, Equation 18 is an equation for generating prediction reference pixels for a 4×4 video block based on the horizontal up mode, i.e., prediction mode 8, in the 4×4 luminance mode.

$$A'=((L)*a+V0+V1+V2+1/2*V3+a/2)/a$$

$$B'=((L)*a+V0+1/2*V1-V2-V3+a/2)/a$$

$$C'=((L)*a+V0-1/2*V1-V2+V3+a/2)/a$$

$$D'=((L)*a+H0-H1+H2-1/2*H3+a/2)/a$$

$$temp1=(J+2*K+L+2)/4$$

$$I'=((temp1)*a+H0+H1+H2+1/2*H3+a/2)/a$$

$$temp2=(K+2*L+L+2)/4$$

$$J'=((temp2)*a+H0+1/2*H1-H2-H3+a/2)/a$$

$$K'=((L)*a+H0-1/2*H1+H2+H3+a/2)/a$$

$$L'=D' \quad \text{[Equation 18]}$$

In the case of four 16×16 luminance prediction modes and four 8×8 color difference modes, if a luminance prediction mode or a color difference mode of an inputted 16×16 or 8×8 video block is determined, the 16×16 or 8×8 video block is divided into 4×4 video blocks, and prediction reference pixels are generated for each of the divided 4×4 video blocks based on the determined intra prediction mode, using Equations 10 to 18 described above.

Figure 8:
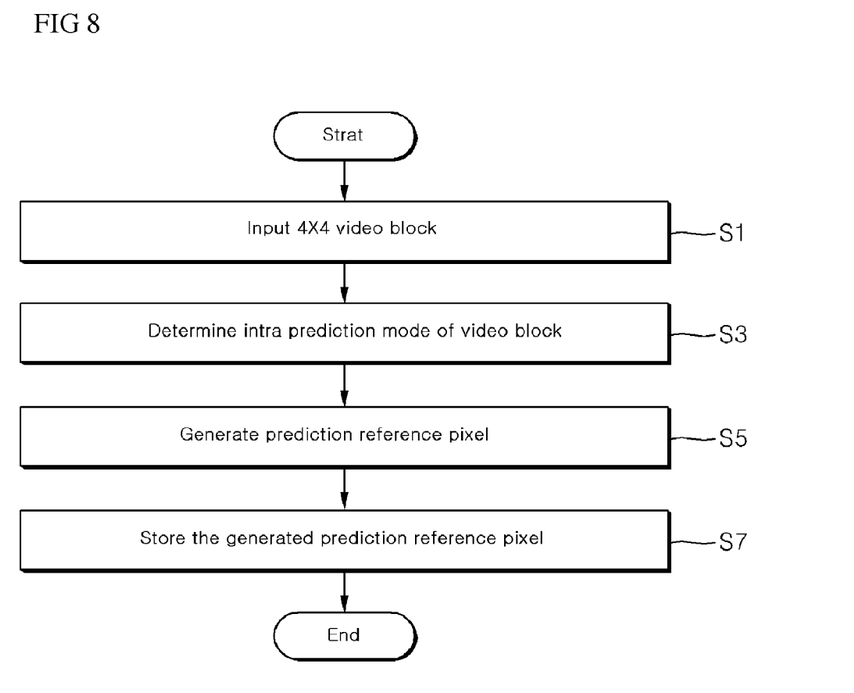
FIG. 8 is a flowchart illustrating a method for generating a prediction reference pixel according to an embodiment of the invention.

FIG. 8 is a flowchart illustrating a method for generating a prediction reference pixel according to an embodiment of the invention.

Describing with reference to FIG. 8, if a 4×4 video block constituting a video frame is inputted S1, an intra prediction mode of the inputted 4×4 video block is determined S3. Prediction reference pixels of a 4×4 video block inputted next to the current 4×4 video block are generated from previously stored prediction reference pixels and residual pixels of the 4×4 video block, based on the intra prediction mode of the inputted 4×4 video block S5. The prediction reference pixels for the 4×4 video block inputted next to the current 4×4 video block are generated differently depending on the determined intra prediction mode of the 4×4 video block. The prediction reference pixels A', B', C', D', I', J', K' and L' generated in step S3 are stored in a storage unit S7, and the stored prediction reference pixels A', B', C', D', I', J', K' and L' are used for computing a DC coefficient of a prediction block for the 4×4 video block inputted next to the current 4×4 video block.

Figure 9:
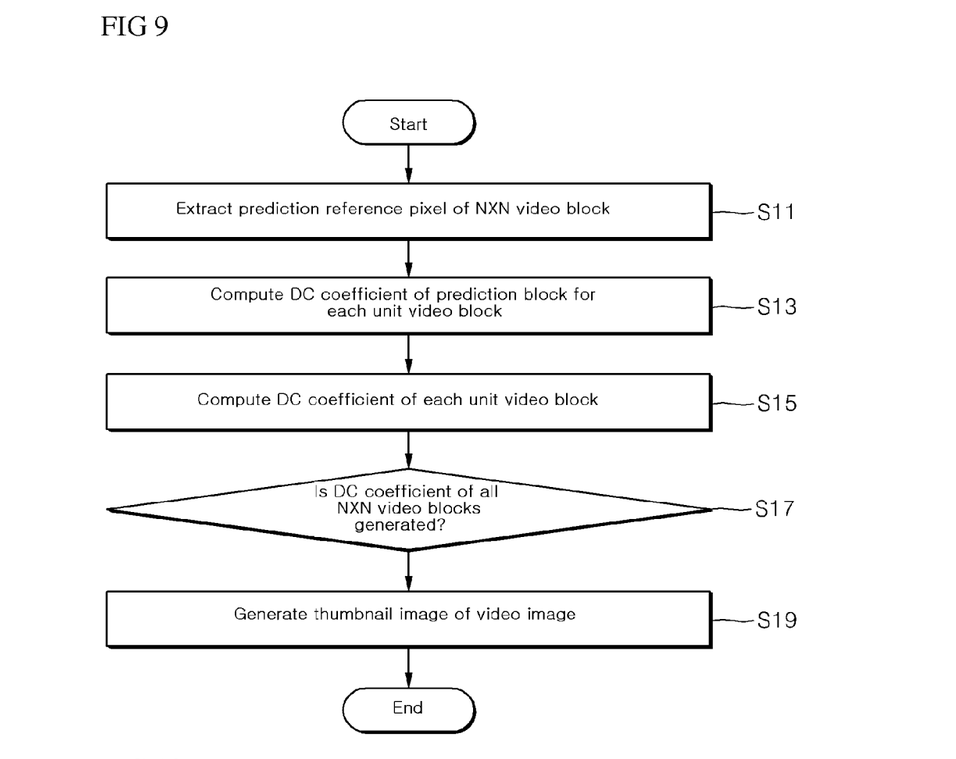
FIG. 9 is a flowchart illustrating a method for generating a thumbnail image for a video frame of standard H.264 according to an embodiment of the invention.

FIG. 9 is a flowchart illustrating a method for generating a thumbnail image for a video frame of standard H.264 according to an embodiment of the invention.

Prediction reference pixels for an N×N video block are extracted S11, and a DC coefficient E of a prediction block for each unit video block constituting the N×N video block is computed based on the extracted prediction reference pixels for the N×N video block and the determined intra prediction mode of the N×N video block S13. The prediction reference pixels for each unit video block constituting the N×N video block are previously generated and stored in the same manner as described above.

A DC coefficient of each unit video block constituting the N×N video block is computed using the DC coefficient E of a prediction block for each unit video block constituting the N×N video block and the DC coefficient $W_{00}$ of an residual coefficient block S15. The DC coefficient for each unit video block constituting the N×N video block is computed as shown in Equation 19.

$$DC \text{ coefficient of N×N video block}=E+W_{00} \quad \text{[Equation 19]}$$

A method for computing a DC coefficient for a 4×4 video block according to nine 4×4 luminance prediction modes will be described below in further detail.

Equation 20 is an equation for computing a DC coefficient for a 4×4 video block based on the vertical mode, i.e., prediction mode 0.

$$DC=16*A+16*B+16*C+16*D+W_{00} \quad \text{[Equation 20]}$$

Equation 21 is an equation for computing a DC coefficient for a 4×4 video block based on the horizontal mode, i.e., prediction mode 1.

$$DC=16*I+16*J+16*K+16*L+W_{00} \quad \text{[Equation 21]}$$

Equation 22 is an equation for computing a DC coefficient for a 4×4 video block based on the DC mode, i.e., prediction mode 2.

$$DC=(A+B+C+D+I+J+K+L)/8+W_{00} \quad \text{[Equation 22]}$$

Equation 23 is an equation for computing a DC coefficient for a 4×4 video block based on the diagonal down-left mode, i.e., prediction mode 3.

$$DC=A+4*B+8*C+12*D+14*E+12*F+8*G+5*H+W_{00} \quad \text{[Equation 23]}$$

Equation 24 is an equation for computing a DC coefficient for a 4×4 video block based on the diagonal down-right mode, i.e., prediction mode 4.

$$DC=14*M+12*A+8*B+4*C+D+12*I+8*J+4*K+L+W_{00} \quad \text{[Equation 24]}$$

Equation 25 is an equation for computing a DC coefficient for a 4×4 video block based on the vertical right mode, i.e., prediction mode 5.

$$DC=11*M+16*A+15*B+10*C+3*D+5*I+3*J+K+W_{00} \quad \text{[Equation 25]}$$

Equation 26 is an equation for computing a DC coefficient for a 4×4 video block based on the horizontal down mode, i.e., prediction mode 6.

$$DC=11*M+5*A+3*B+C+16*I+15*J+10*K+3*L+W_{00} \quad \text{[Equation 26]}$$

Equation 27 is an equation for computing a DC coefficient for a 4×4 video block based on the vertical left mode, i.e., prediction mode 7.

$$DC=3*A+10*B+15*C+16*D+13*E+6*F+G+W_{00} \quad \text{[Equation 27]}$$

Equation 28 is an equation for computing a DC coefficient for a 4×4 video block based on the horizontal up mode, i.e., prediction mode 8.

$$DC=3*I+10*J+15*K+36*L+W_{00} \quad \text{[Equation 28]}$$

Figure 11:
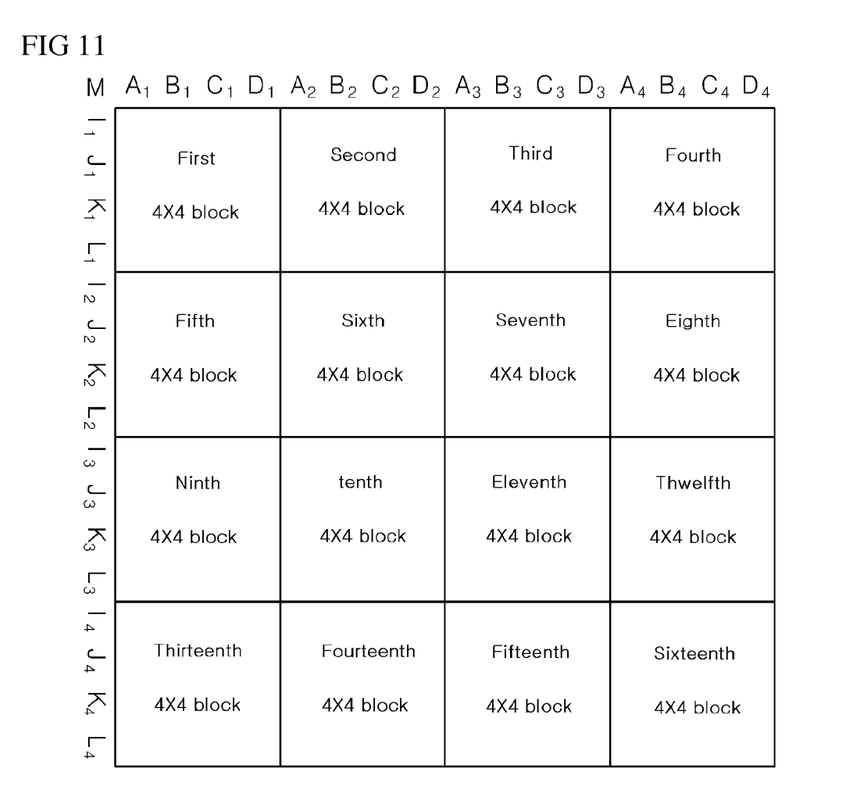
FIG. 11 is a view showing an example of a 16×16 video block.

In the meantime, a method for computing a DC coefficient for a 16×16 video block according to four 16×16 luminance prediction modes will be described below in further detail. The DC coefficient for the 16×16 video block is computed such that a DC coefficient of each unit video block is computed by adding a DC coefficient and an residual coefficient of a prediction block for each unit video block constituting the 16×16 video block, and then a DC coefficient of the entire 16×16 video block is computed.

Equation 29 is an equation for computing a DC coefficient for respective unit video blocks constituting the 16×16 video block, i.e., first to sixteenth 4×4 video blocks, based on the vertical mode, i.e., prediction mode 0.

$$DC=16*A_i+16*B_i+16*C_i+16*D_i+W_{00ij} \, j=1,2,3,4 \, j=2,3,4 \quad \text{[Equation 29]}$$

Equation 30 is an equation for computing a DC coefficient for first to sixteenth 4×4 video blocks constituting a 16×16 video block, based on the horizontal mode, i.e., prediction mode 1.

$$DC=16*I_j+16*J_j+16*K_j+16*L_j+W_{00ij} \, i=1,2,3,4 \, j=3,4 \quad \text{[Equation 30]}$$

Equation 31 is an equation for computing a DC coefficient for first to sixteenth 4×4 video blocks constituting a 16×16 video block, based on the DC mode, i.e., prediction mode 2.

$$DC=(A_i+B_i+C_i+D_i+I_j+J_j+K_j+L_j)/8+W_{00ij} \, i=1,2,3,4 \, j=1,2,3,4 \quad \text{[Equation 31]}$$

Equation 32 is an equation for computing a DC coefficient for first to sixteenth 4×4 video blocks constituting a 16×16 video block, based on the diagonal down-left mode, i.e., prediction mode 3.

$$ih=(A_3-C_2)+2*(B_3-B_2)+3*(C_3-A_2)+4*(D_3-D_1)+5*(A_4-C_1)+6*(B_4-B_1)+7*(C_4-A_1)+8*(D_4-M)$$

$$iv=(I_3-K_2)+2*(J_3-J_2)+3*(J_3I_2)+4*(J_3L_1)+5*(I_4-K_1)+6*(J_4-J_1)+7*(J_4-I_1)+8*(J_4-M) \quad \text{[Equation 32]}$$

if it is assumed that a=64, $$ib=(5*ih+a/2)/a,$$

$$ic=(5*iv+a/2)/a, \text{ and}$$

$$iaa=16*(D_4+L_4),$$

DC of the first 4×4 video block=$2*iaa-11*ib-11*ic+a/2+W_{00}$ of the first block,
DC of the second 4×4 video block=$2*iaa-3*ib-11*ic+a/2+W_{00}$, of the second block,
DC of the third 4×4 video block=$2*iaa+5*ib-11*ic+a/2+W_{00}$ of the third block,
DC of the fourth 4×4 video block=$2*iaa+13*ib-11*ic+a/2+W_{00}$ of the fourth block,
DC of the fifth 4×4 video block=$2*iaa-11*ib-3*ic+a/2+W_{00}$ of the fifth block,
DC of the sixth 4×4 video block=$2*iaa-3*ib-3*ic+a/2+W_{00}$ of the sixth block,
DC of the seventh 4×4 video block=$2*iaa+5*ib-3*ic+a/2+W_{00}$ of the seventh block,
DC of the eighth 4×4 video block=$2*iaa+13*ib-3*ic+a/2+W_{00}$ of the eighth block,
DC of the ninth 4×4 video block=$2*iaa-11*ib+5*ic+a/2+W_{00}$ of the ninth block,
DC of the tenth 4×4 video block=$2*iaa-3*ib+5*ic+a/2+W_{00}$ of the tenth block,
DC of the eleventh 4×4 video block=$2*iaa+5*ib+5*ic+a/2+W_{00}$ of the eleventh block,
DC of the twelfth 4×4 video block=$2*iaa+13*ib+5*ic+a/2+W_{00}$ of the twelfth block,
DC of the thirteenth 4×4 video block=$2*iaa-11*ib+13*ic+a/2+W_{00}$ of the thirteenth block,
DC of the fourteenth 4×4 video block=$2*iaa-3*ib+13*ic+a/2+W_{00}$ of the fourteenth block,
DC of the fifteenth 4×4 video block=$2*iaa+5*ib+13*ic+a/2+W_{00}$ of the fifteenth block, and
DC of the sixteenth 4×4 video block=$2*iaa+13*ib+13*ic+a/2+W_{00}$ of the sixteenth block.

Figure 12:
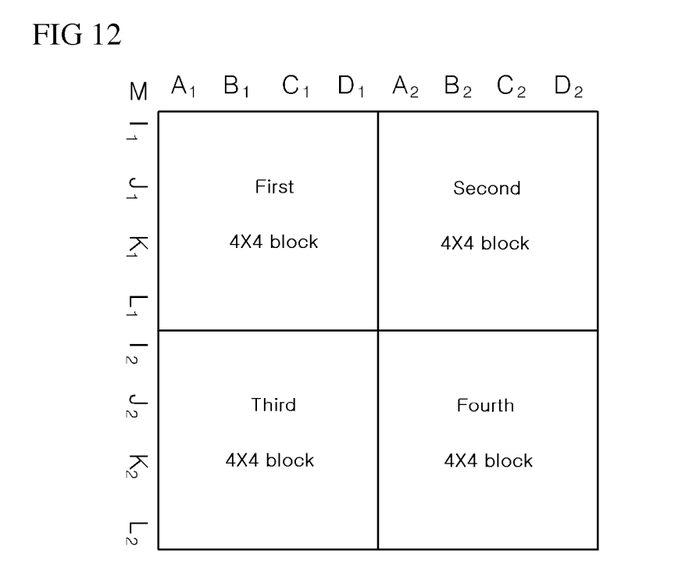
FIG. 12 is a view showing an example of an 8×8 video block.

In the meantime, a method for computing a DC coefficient for an 8×8 video block according to four 8×8 color difference prediction modes will be described below in further detail. The DC coefficient for the 8×8 video block is computed such that a DC coefficient of each unit video block is computed by adding a DC coefficient and an residual coefficient of a prediction block for each unit video block constituting the 8×8 video block, and then a DC coefficient of the entire 8×8 video block is computed.

Equation 33 is an equation for computing a DC coefficient for first to fourth 4×4 video blocks constituting an 8×8 video block, based on the vertical mode, i.e., prediction mode 0.

$$DC=16*A_i+16*B_i+16*C_i+16_i*D+W_{00ij} \, i=1,2 \, j=1,2 \quad \text{[Equation 33]}$$

Equation 34 is an equation for computing a DC coefficient for first to fourth 4×4 video blocks constituting an 8×8 video block, based on the horizontal mode, i.e., prediction mode 1.

$$DC=16*I_j+16*J_j+16*K_j+16*L_j+W_{00ij} \, i=1,2 \, j=1,2 \quad \text{[Equation 34]}$$

Equation 35 is an equation for computing a DC coefficient for first to fourth 4×4 video blocks constituting an 8×8 video block, based on the DC mode, i.e., prediction mode 2.

$$DC=(A_i+B_i+C_i+D_i+I_j+J_j+K_j+L_j)/8+W_{00ij}=1,2 \, j=1,2 \quad \text{[Equation 35]}$$

Equation 36 is an equation for computing a DC coefficient for first to fourth 4×4 video blocks constituting an 8×8 video block, based on the plane mode, i.e., prediction mode 3.

$$ih=(A_2-C_i)+2*(B_2-B_1)+3*(C_2-A_1)+4*(D_2-M)$$

$$iv=(I2-K_1)+2*(J_2-J_1)+3*(J_2-I_1)+4*(J_2-M) \quad \text{[Equation 36]}$$

if it is assumed that a=64, $$ib=(17*ih+a/2)/a,$$

$$ic=(17*iv+a/2)/a, \text{ and}$$

$$iaa=16*(D_2-L_2),$$

DC coefficients are computed as

DC of the first 4×4 video block=2*iaa−3*ib−3*ic+a/2+$W_{00}$ of the first block, DC of the second 4×4 video block=2*iaa+5*ib−3*ic+a/2+$W_{00}$ of the second block, DC of the third 4×4 video block=2*iaa−3*ib+5*ic+a/2+$W_{00}$ of the third block, and DC of the fourth 4×4 video block=2*iaa+5*ib+5*ic+a/2+$W_{00}$ of the fourth block.

The sequence of prediction reference pixels $A_1, B_1, C_1, D_1, A_2, B_2, C_2, D_2, A_3, B_3, C_3, D_3, A_4, B_4, C_4, D_4, M, I_1, J_1, K_1, L_1, I_2, J_2, K_2, L_2, I_3, J_3, K_3, L_3, I_4, J_4, K_4$ and $L_4$ of the spatial domain for the 16×16 video block, inputted in Equations 29 to 32, and first to sixteenth 4×4 video blocks constituting the 16×16 video block is as shown in FIG. 11.

The sequence of prediction reference pixels $A_1, B_1, C_1, D_1, A_2, B_2, C_2, D_2, M, I_1, J_1, K_1, L_1, I_2, J_2, K_2$ and $L_2$ of the spatial domain for the 8×8 video block, inputted in Equations 33 to 36, and first to fourth 4×4 video blocks constituting the 8×8 video block is as shown in FIG. 12.

As is understood from Equations 20 to 36, all reference pixel blocks for the 4×4 video block do not need to be reconstructed, and prediction pixels of the 4×4 video block are computed by reconstructing only the reference pixels used for computing a prediction block of the 4×4 video block among the pixels constituting a reference pixel block for the 4×4 video block, i.e., prediction reference pixels. Furthermore, a DC coefficient of each unit video block constituting an N×N video block is simply computed by computing a DC coefficient of a prediction block for each unit video block constituting the N×N video block directly from the prediction reference pixels of the N×N video block and adding the computed DC coefficient of a prediction block for each unit video block and the DC coefficient of the residual coefficient block for each unit video block.

Preferably, in the case of the first video block among the video blocks constituting a vide frame, prediction reference data of the first video block is set to 128, and the DC coefficient is computed as shown in Equation 37.

$$DC\text{ coefficient}=(A+B+C+D+I+J+K+L)/8+W_{00} \quad [\text{Equation 37}]$$

It is determined whether or not a DC coefficient is computed for all N×N video blocks constituting the video frame S17, and if the DC coefficient is not computed for all the N×N video blocks, steps S11 to S15 described above are repeated for the DC coefficient of the next N×N video block, thereby computing DC coefficients of all the N×N video blocks. If it is determined that the DC coefficient is computed for all the N×N video blocks constituting the Video frame in step S17, a thumbnail image of the video frame is generated using the DC coefficients of all the N×N video blocks S19.

Figure 10:
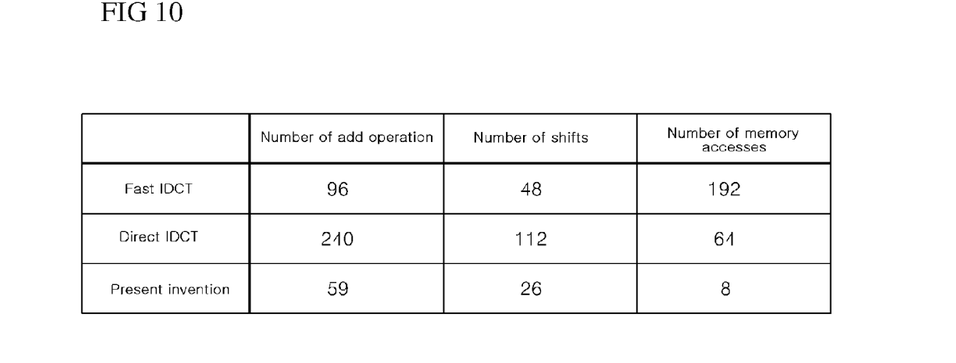
FIG. 10 is a table comparing the number of computations and memory accesses of a conventional method for generating a prediction block using a fast inverse DCT (IDCT), a method for generating a prediction block using a direct inverse-DCT, and a method for generating a prediction block according to the present invention.

FIG. 10 is a table comparing the number of computations and memory accesses needed to generate prediction reference pixels in a conventional method for generating prediction reference pixels using a fast inverse DCT (IDCT), a method for generating prediction reference pixels using a direct inverse-DCT, and a method for generating prediction reference pixels according to the present invention. The table in FIG. 10 shows the number of computations and memory accesses needed for generating prediction reference pixels from the 4×4 residual coefficient block.

Referring to FIG. 10, the number of add operations required to reconstruct all reference pixels needed in a method for generating a prediction block using a fast inverse-DCT is 96, the number of shifts is 48, and the number of memory accesses is 192. In the meantime, the number of add operations required to reconstruct all reference pixels needed in a method for generating prediction reference pixels using a direct inverse-DCT is 240, the number of shifts is 112, and the number of memory successes is 64. In the meantime, the number of add operations required to generate only the prediction reference pixels needed for generating a prediction block in a method for generating prediction reference pixels according to the present invention is 59, the number of shifts is 26, and the number of memory successes is 8. As is understood from FIG. 10, the method for generating a prediction block according to the present invention can rapidly encode a video block owing to a low computing amount and a small number of memory accesses, as compared to a conventional method for generating a prediction block using a fast inverse-DCT or a direct inverse-DCT.

In the meantime, the embodiments of the present invention described above can be carried out using a computer-executable program and implemented in a general-purpose digital computer that operates the program using a computer-readable recording medium.

The computer-readable recording medium includes magnetic storage media (e.g., ROM, floppy disk, hard disk, etc.), optically-readable media (e.g., CD-ROM, DVD, etc.), and carrier waves (e.g., transmission through the Internet).

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

INDUSTRIAL APPLICABILITY

The method for generating a thumbnail image according to the invention can more easily and promptly generate the thumbnail image, and thus will be widely used in a variety of video apparatuses that use thumbnail images, as compared to the conventional methods for generating a thumbnail performed through a complex process.

The invention claimed is:

1. A method for generating a thumbnail image from H.264-based N×N video blocks constituting a video frame, the method comprising the steps of:
   (a) extracting prediction reference pixels for one of the N×N video blocks;
   (b) computing a DC coefficient of a prediction block for each unit video block constituting the N×N video block using the extracted prediction reference pixels of the N×N video block, based on an intra-prediction mode of the N×N video block; and
   (c) computing a DC coefficient of the N×N video block by adding the computed DC coefficient of the prediction block for each unit video block and a DC coefficient of a residual block for each unit video block,
   wherein next prediction reference pixels are computed by adding prediction pixels to residual pixels, the next prediction pixels are placed on right and bottom borders of each unit video block,
   wherein the residual pixels include pixels placed on the right and bottom borders of each unit video block and are computed using transform element values computed from a residual coefficient block W for each unit video block, wherein the transform element values include $H_0$, $H_1$, $H_2$, $H_3$, $V_0$, $V_1$, $V_2$ and $V_3$ generated by the following Equations 1 to 8:

$$H_0 = W_{00} - W_{01} + W_{02} - \frac{1}{2}W_{03} \quad \text{[Equation 1]}$$

$$H_1 = W_{10} - W_{11} + W_{12} - \frac{1}{2}W_{13} \quad \text{[Equation 2]}$$

$$H_2 = W_{20} - W_{21} + W_{22} - \frac{1}{2}W_{23} \quad \text{[Equation 3]}$$

$$H_3 = W_{30} - W_{31} + W_{32} - \frac{1}{2}W_{33} \quad \text{[Equation 4]}$$

$$V_0 = W_{00} - W_{10} + W_{20} - \frac{1}{2}W_{30} \quad \text{[Equation 5]}$$

$$V_1 = W_{01} - W_{11} + W_{21} - \frac{1}{2}W_{31} \quad \text{[Equation 6]}$$

$$V_2 = W_{02} - W_{12} + W_{22} - \frac{1}{2}W_{32} \quad \text{[Equation 7]}$$

$$V_3 = W_{03} - W_{13} + W_{23} - \frac{1}{2}W_{33}, \text{ and} \quad \text{[Equation 8]}$$

wherein the residual coefficient block W of a transform domain for the unit video block is expressed by the following Equation 9:

$$W = \begin{bmatrix} W_{00} & W_{01} & W_{02} & W_{03} \\ W_{10} & W_{11} & W_{12} & W_{13} \\ W_{20} & W_{21} & W_{22} & W_{23} \\ W_{30} & W_{31} & W_{32} & W_{33} \end{bmatrix}. \quad \text{[Equation 9]}$$

2. The method according to claim 1, further comprising the step of:
generating the thumbnail image of the video frame by repeatedly performing the steps (a) to (c) on the N×N video blocks constituting the video frame and extracting a DC coefficient for the N×N video blocks constituting the video frame.

3. The method according to claim 2, wherein the DC coefficient of the prediction block for each unit video block is computed by a combination of the prediction reference pixels for the N×N video block.

4. The method according to claim 2, wherein the prediction reference pixels are reference pixels in a neighborhood of the N×N video block used for intra-prediction of the N×N video block.

5. The method according to claim 2, further comprising the step of:
(a1) computing prediction pixels placed on right and bottom borders of each unit video block, from previously stored prediction reference pixels of each unit video block, based on the intra-prediction mode of each unit video block;
(a2) computing the residual pixels placed on the right and bottom borders of each unit video block using transform element values;
(a3) generating the next prediction reference pixels for a next unit video block inputted next to each unit video block by adding the computed prediction pixels and the residual pixels; and
(a4) storing the generated next prediction reference pixels of the next unit video block.

6. The method according to claim 5, wherein if a size of the N×N video block is a 4×4 video block, the prediction reference pixels of the N×N video block are 13 reference pixels in a neighborhood of the N×N video block used for intra-prediction of the N×N video block.

7. A method for generating a thumbnail image from H.264-based N×N video blocks constituting a video frame, the method comprising the steps of:
(a) extracting prediction reference pixels for one of the N×N video blocks;
(b) computing a DC coefficient of a prediction block for each unit video block constituting the N×N video block using the extracted prediction reference pixels of the N×N video block, based on an intra-prediction mode of the N×N video block;
(c) computing a DC coefficient of the N×N video block by adding the computed DC coefficient of the prediction block for each unit video block and a DC coefficient of a residual block for each unit video block;
(d) generating the thumbnail image of the video frame by repeatedly performing the steps (a) to (c) on the N×N video blocks constituting the video frame and extracting a DC coefficient for the N×N video blocks constituting the video frame;
(e) computing prediction pixels from previously stored prediction reference pixels of each unit video block, based on the intra-prediction mode of each unit video block;
(f) computing the residual pixels;
(g) generating prediction reference pixels for a next unit video block inputted next to each unit video block by adding the computed prediction pixels and the residual pixels; and
(h) storing the generated prediction reference pixels of the next unit video block,
whereby the prediction reference pixels are generated on the basis of unit video block constituting the N×N video block,
wherein the residual pixels of each unit video block are computed using transform element values computed from an residual coefficient block W for each unit video block, and the transform element values include $H_0$, $H_1$, $H_2$, $H_3$, $V_0$, $V_1$, $V_2$ and $V_3$ generated by the following Equations 1 to 8:

$$H_0 = W_{00} - W_{01} + W_{02} - \frac{1}{2}W_{03} \quad \text{[Equation 1]}$$

$$H_1 = W_{10} - W_{11} + W_{12} - \frac{1}{2}W_{13} \quad \text{[Equation 2]}$$

$$H_2 = W_{20} - W_{21} + W_{22} - \frac{1}{2}W_{23} \quad \text{[Equation 3]}$$

$$H_3 = W_{30} - W_{31} + W_{32} - \frac{1}{2}W_{33} \quad \text{[Equation 4]}$$

$$V_0 = W_{00} - W_{10} + W_{20} - \frac{1}{2}W_{30} \quad \text{[Equation 5]}$$

$$V_1 = W_{01} - W_{11} + W_{12} - \frac{1}{2}W_{31} \quad \text{[Equation 6]}$$

$$V_2 = W_{02} - W_{12} + W_{22} - \frac{1}{2}W_{32} \quad \text{[Equation 7]}$$

$$V_3 = W_{03} - W_{13} + W_{23} - \frac{1}{2}W_{33}, \quad \text{[Equation 8]}$$

wherein the residual coefficient block W of a transform domain for each unit video block is expressed by the following Equation 9:

$$W = \begin{bmatrix} W_{00} & W_{01} & W_{02} & W_{03} \\ W_{10} & W_{11} & W_{12} & W_{13} \\ W_{20} & W_{21} & W_{22} & W_{23} \\ W_{30} & W_{31} & W_{32} & W_{33} \end{bmatrix}.$$

[Equation 9]

\* \* \* \* \*